J. EDGAR.
FIRE-SHOVEL.

No. 173,920.

Patented Feb. 22, 1876.

Witnesses.
Otto Hufeland
Chas. Wahlers.

Inventor.
James Edgar
per
Van Santvoord & Hauff
Attorneys.

UNITED STATES PATENT OFFICE

JAMES EDGAR, OF NEW YORK, N. Y.

IMPROVEMENT IN FIRE-SHOVELS.

Specification forming part of Letters Patent No. 173,920, dated February 22, 1876; application filed January 27, 1876.

*To all whom it may concern:*

Be it known that I, JAMES EDGAR, of the city, county, and State of New York, have invented a new and useful Improvement in Fire-Shovels, which improvement is fully set forth in the following specification, reference being had to the accompanying drawing, in which—

Figure 1:
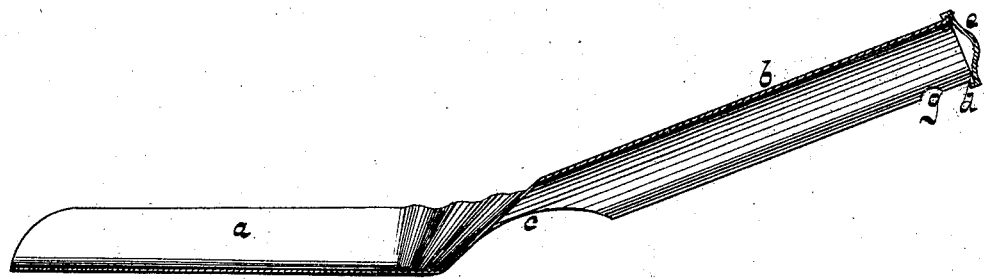
Figure 2:
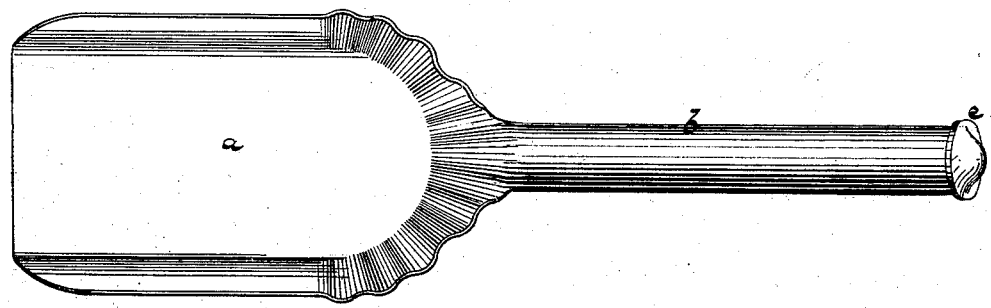
Figure 3:
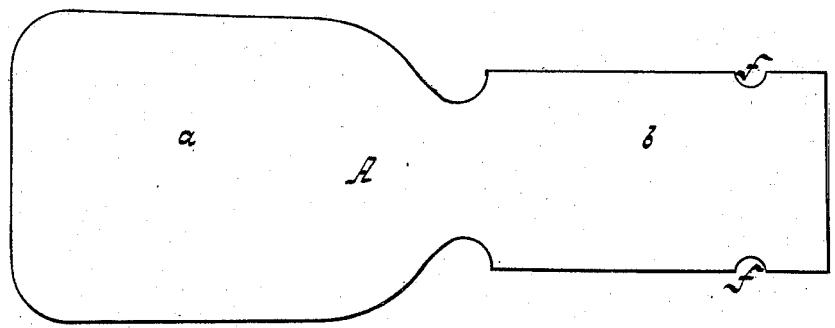

Figure 1 represents a longitudinal vertical section of my shovel. Fig. 2 is a plan or top view of the same. Fig. 3 is a plan of the blank which I use for my shovel.

Similar letters indicate corresponding parts.

The invention consists in a fire-shovel stamped or struck up from a single piece of sheet metal, as will be fully hereinafter described.

In the drawing, the letter A designates the blank which I use in the manufacture of my shovel, the part $a$ being intended for the scoop, and the part $b$ for the handle. The scoop $a$ is provided with a rim that is corrugated toward the place where it joins the handle $b$, and, in the act of stamping up the scoop and the handle, flanges or braces $c$ are formed at the junction between the handle and the scoop, and thereby the connection between these parts is rendered strong and secure.

The handle is brought in the form of a hollow cylinder by turning the sheet metal over a suitable mandrel, and the outer edge of the hollow handle is bent out to form a flange, $d$, over which is fastened a cap, $e$.

The blank A is provided at its edges with two semi-cylindrical incisions, $f$, and when the handle is ready formed, these incisions form a hole, $g$, Fig. 1, which can be used for hanging up the shovel.

The cylindrical hollow handle is of great convenience for the hand, and my new shovel can be produced without much, if any, additional expense for stock, and it is superior in strength, convenience, and durability, to shovels of a similar nature with V-shaped handles.

What I claim as new, and desire to secure by Letters Patent, is—

As an article of manufacture, the fire-shovel herein shown and described.

In testimony that I claim the foregoing I have hereunto set my hand and seal this 24th day of January, 1876.

JAMES EDGAR. [L. S.]

Witnesses:
 W. HAUFF,
 E. F. KASTENHUBER.